(12) United States Patent
Etsion et al.

(10) Patent No.: US 12,468,572 B2
(45) Date of Patent: *Nov. 11, 2025

(54) INTER-THREAD COMMUNICATION WITHIN THE COMPUTE FABRIC OF A MULTI-THREADED RECONFIGURABLE COARSE-GRAIN ARRAY WITHOUT ACCESSING SYSTEM MEMORY

(71) Applicant: Speedata Ltd., Haifa (IL)

(72) Inventors: Yoav Etsion, Atlit (IL); Dani Voitsechov, Atlit (IL)

(73) Assignee: Speedata Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/530,273

(22) Filed: Dec. 6, 2023

(65) Prior Publication Data

US 2024/0103912 A1 Mar. 28, 2024

Related U.S. Application Data

(63) Continuation of application No. 17/015,275, filed on Sep. 9, 2020, now Pat. No. 11,900,156.

(60) Provisional application No. 62/904,706, filed on Sep. 24, 2019.

(51) Int. Cl.
*G06F 9/48* (2006.01)
*G06F 9/38* (2018.01)
*G06F 9/50* (2006.01)
*G06F 9/54* (2006.01)

(52) U.S. Cl.
CPC .......... *G06F 9/4881* (2013.01); *G06F 9/3822* (2013.01); *G06F 9/3836* (2013.01); *G06F 9/3887* (2013.01); *G06F 9/3889* (2013.01); *G06F 9/5027* (2013.01); *G06F 9/544* (2013.01)

(58) Field of Classification Search
None
See application file for complete search history.

(56) References Cited

U.S. PATENT DOCUMENTS

| | | | |
|---|---|---|---|
| 10,713,059 B2 * | 7/2020 | Greathouse | G06F 9/3888 |
| 2009/0070552 A1 * | 3/2009 | Kanstein | G06F 15/7867 |
| | | | 717/140 |
| 2009/0165006 A1 * | 6/2009 | Ceze | G06F 9/463 |
| | | | 718/102 |

(Continued)

OTHER PUBLICATIONS

EP Application # 21795366.0 Search Report dated Feb. 16, 2024.
EP Application # 21795944.4 Search Report dated Feb. 12, 2024.

*Primary Examiner* — Abu Zar Ghaffari
(74) *Attorney, Agent, or Firm* — Meitar Patents Ltd.; Daniel Kligler

(57) ABSTRACT

A processor includes a compute fabric and a controller. The compute fabric includes an array of compute nodes and interconnects that configurably connect the compute nodes. The controller is configured to configure at least some of the compute nodes and interconnects in the compute fabric to execute specified code instructions, and to send to the compute fabric multiple threads that each executes the specified code instructions. A compute node among the compute nodes is configured to execute a code instruction for a first thread, and to transfer a result of the code instruction within the fabric, for use as an operand by a second thread, different from the first thread.

14 Claims, 3 Drawing Sheets

(56) References Cited

U.S. PATENT DOCUMENTS

| | | | |
|---|---|---|---|
| 2012/0166762 A1* | 6/2012 | Park | G06F 9/3897 |
| | | | 712/20 |
| 2013/0042090 A1* | 2/2013 | Krashinsky | G06F 9/38885 |
| | | | 712/214 |
| 2013/0159669 A1* | 6/2013 | Comparan | G06F 9/3851 |
| | | | 712/E9.002 |
| 2013/0166670 A1* | 6/2013 | Wayda | G06F 3/067 |
| | | | 709/219 |
| 2014/0181477 A1* | 6/2014 | Vaidya | G06F 9/30038 |
| | | | 712/208 |
| 2015/0127927 A1* | 5/2015 | Paddon | G06F 9/3009 |
| | | | 712/225 |
| 2016/0246728 A1* | 8/2016 | Ron | G06F 9/30123 |
| 2016/0259668 A1* | 9/2016 | Glauert | G06T 1/20 |
| 2019/0303168 A1* | 10/2019 | Fleming, Jr. | G06F 9/4494 |
| 2019/0304054 A1* | 10/2019 | Appu | G09G 5/363 |
| 2019/0317770 A1* | 10/2019 | Sankaralingam | G06F 15/825 |
| 2020/0004690 A1* | 1/2020 | Mathew | G06F 12/0813 |

\* cited by examiner

INTER-THREAD COMMUNICATION WITHIN THE COMPUTE FABRIC OF A MULTI-THREADED RECONFIGURABLE COARSE-GRAIN ARRAY WITHOUT ACCESSING SYSTEM MEMORY

CROSS-REFERENCE TO RELATED APPLICATIONS

This application is a continuation of U.S. patent application Ser. No. 17/015,275, filed Sep. 9, 2020, which claims the benefit of U.S. Provisional Patent Application 62/904,706, filed Sep. 24, 2019. The disclosures of these related applications are incorporated herein by reference.

FIELD OF THE INVENTION

The present invention relates generally to processor architectures, and particularly to Coarse-Grain Reconfigurable Array (CGRA) processors.

BACKGROUND OF THE INVENTION

Coarse-Grain Reconfigurable Array (CGRA) is a computing architecture in which an array of interconnected computing elements is reconfigured on demand to execute a given program. Various CGRA-based computing techniques are known in the art. For example, U.S. Patent Application Publication 2018/0101387, whose disclosure is incorporated herein by reference, describes a GPGPU-compatible architecture that combines a coarse-grain reconfigurable fabric (CGRF) with a dynamic dataflow execution model to accelerate execution throughput of massively thread-parallel code. The CGRA distributes computation across a fabric of functional units. The compute operations are statically mapped to functional units, and an interconnect is configured to transfer values between functional units.

SUMMARY OF THE INVENTION

An embodiment of the present invention that is described herein provides a processor including a compute fabric and a controller. The compute fabric includes an array of compute nodes and interconnects that configurably connect the compute nodes. The controller is configured to configure at least some of the compute nodes and interconnects in the compute fabric to execute specified code instructions, and to send to the compute fabric multiple threads that each executes the specified code instructions. A compute node among the compute nodes is configured to execute a code instruction for a first thread, and to transfer a result of the code instruction within the fabric, for use as an operand by a second thread, different from the first thread.

In some embodiments, transfer of the result is internal to the compute node that executes the code instruction. In other embodiments, the compute node that executes the code instruction is configured to transfer the result to a different compute node in the fabric.

In some embodiments, the compute node is configured to transfer the result by saving the result to a token buffer in the fabric. In an embodiment, the token buffer is formed of a cascade of two or more token buffers of two or more of the compute nodes.

In some embodiments, in transferring the result, the compute node is configured to associate the result with the second thread. In an example embodiment, the compute node is configured to transfer the result by saving the result to a token buffer that comprises multiple slots, each slot assigned to a respective thread, and to associate the result with the second thread by saving the result to a slot assigned to the second thread. In an alternative embodiment, the compute node is configured to associate the result with the second thread by transferring metadata that specifies the second thread.

In a disclosed embodiment, the multiple threads have a predefined order of execution, and the first thread is earlier than the second thread in the order of execution. In another embodiment, the multiple threads have a predefined order of execution, and the first thread is later than the second thread in the order of execution.

In some embodiments, the compute node is configured to transfer the result only when an identifier of the second thread is within a valid range. In some embodiments, at least one of the compute nodes, which is assigned to use the result as an operand, is configured to use the transferred result only when an identifier of the second thread is within a valid range. In an embodiment, when the identifier of the second thread is outside the valid range, the compute node, which is assigned to use the result as an operand, is configured to obtain the operand for execution of the second thread from an alternative source.

There is additionally provided, in accordance with an embodiment of the present invention, a method in a processor that includes a compute fabric comprising an array of compute nodes and interconnects that configurably connect the compute nodes. The method includes configuring at least some of the compute nodes and interconnects in the compute fabric to execute specified code instructions. Multiple threads, that each executes the specified code instructions, are sent to the compute fabric. A code instruction is executed for a first thread in a compute node among the compute nodes. A result of the code instruction is transferred within the fabric, for use as an operand by a second thread, different from the first thread.

The present invention will be more fully understood from the following detailed description of the embodiments thereof, taken together with the drawings in which:

DETAILED DESCRIPTION OF EMBODIMENTS

Overview

Figure 1:
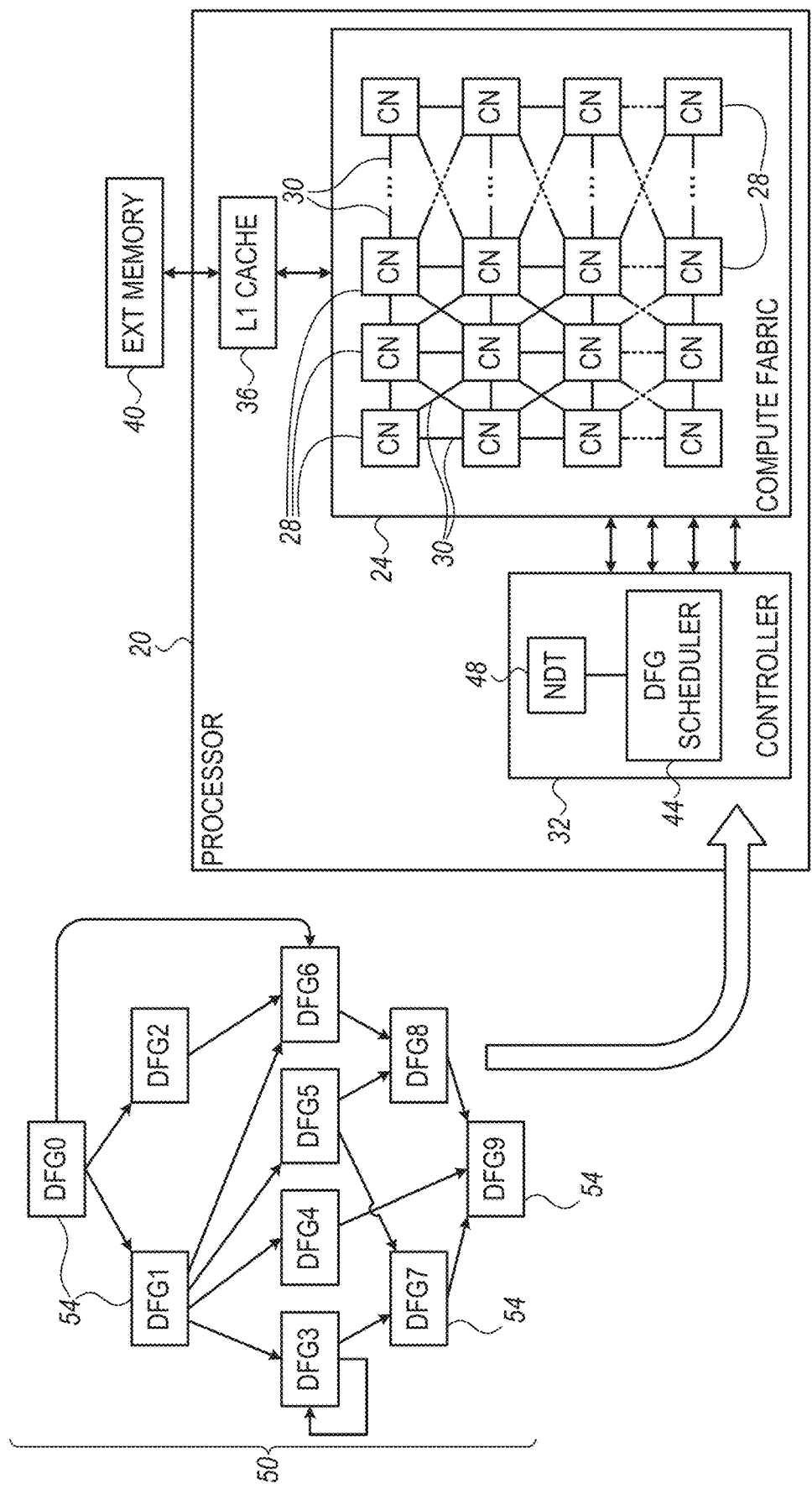
FIG. 1 is a block diagram that schematically illustrates a Coarse-Grain Reconfigurable Array (CGRA) processor, in accordance with an embodiment of the present invention.

Embodiments of the present invention that are described herein provide improved methods and devices for Coarse- Grain Reconfigurable Array (CGRA) computing. An example CGRA-based processor comprises a coarse-grain compute fabric, and a controller that configures and controls the compute fabric. The compute fabric comprises (i) an array of compute nodes and (ii) interconnects that configurably connect the compute nodes.

The controller receives compiled software code, also referred to as a software program, which is represented as a Data-Flow Graph (DFG). The controller configures the compute nodes and the interconnects in accordance with the DFG, thereby configuring the fabric to execute the program. The controller then sends to the compute fabric multiple threads, which the fabric executes in accordance with the DFG in a pipelined manner.

Multiple threads typically execute the same code, as represented by the DFG, on different data. (Strictly speaking, different threads differ slightly from one another in that they depend on the thread number, e.g., in specifying different memory addresses from which to fetch the different data. Nevertheless, in the present context such threads are regarded herein as executing the same code. While different threads execute the same static code, dynamic execution may differ from one thread to another due to differences in data.)

In some embodiments, the controller comprises a scheduler that schedules execution of various DFGs on the fabric. When a certain DFG is scheduled, the scheduler "maps the DFG onto the fabric," i.e., configures at least some of the compute nodes and interconnects in the fabric to execute the code instructions specified in the DFG. The scheduler sends to the fabric multiple threads for execution, and the fabric executes the threads in accordance with the DFG, typically beginning with reading initial values for the various threads from memory. During the execution of the threads on the currently-scheduled DFG, the fabric saves the results of the various threads to memory, and the scheduler reconfigures the fabric to execute the next DFG. Scheduling, reconfiguration and execution proceeds in this manner until all threads complete executing the software program, or until the controller decides to suspend processing for any reason.

Further aspects of running multiple threads on a CGRA fabric are addressed in U.S. Patent Application Publications 2018/0101387 and 2020/0159539, and in U.S. patent application Ser. Nos. 16/860,070 and 16/889,159, whose disclosures are incorporated herein by reference.

In a typical implementation, each compute node in the fabric comprises a compute element, a token buffer and a switch. The compute element is configured to execute a code instruction on one or more operands so as to produce a result. The token buffer is configured to store input tokens, which comprise operands for use by the compute element. The switch is configured to connect the compute element and the token buffer to other compute elements in the fabric. The compute element typically outputs the execution results as output tokens, via the switch, to a compute node that is assigned to use them as input tokens.

As noted above, the fabric executes multiple threads in a pipelined manner, in accordance with a predefined DFG. Typically, a given compute node is configured to execute a particular code instruction for the multiple threads. Typically, the compute node reads from the token buffer an input token that is associated with a thread and contains an operand, and executes the code instruction on the operand. The compute element then writes an output token comprising the execution result to the switch, or possibly to the token buffer of the next compute node (via the switch). The output token is associated with the thread. The compute element then proceeds to read an input token associated with the next thread, and so on.

In some embodiments of the present invention, at least some of the compute nodes in the fabric are configured to pass information (e.g., execution results) between different threads. In a typical embodiment, a certain compute node (referred to in this context as a producer compute node) executes a certain code instruction, e.g., a computation, for a certain thread (referred to in this context as a producer thread). The producer compute node then transfers the execution result to the same compute node or to a different compute node (referred to in this context as a consumer compute node), for use in a different thread (referred to in this context as a consumer thread). The consumer compute node uses the transferred result as an operand in executing a code instruction for the consumer thread.

In some disclosed embodiments, the information transfer is performed via the token buffers of the compute nodes, not via the memory system of the processor. As such, information transfer between threads is efficient and incurs only small, predictable latency. Generally, however, the information may be transferred and/or saved within the fabric in any other suitable way. In the present context, the term "within the fabric" refers to any means of transfer and/or storage that does not exit the fabric and in particular does not pass through the memory system of the processor.

When writing data to the token buffer, or otherwise transferring the data between threads, the producer compute node may use various techniques to specify the identity of the consumer thread that is to use the data. For example, the producer compute node may write the data to a slot of the token buffer that has been preassigned to the consumer thread. As another example, the producer compute node may transfer, along with the data, metadata that specifies the consumer thread.

Various example implementations of direct data transfer between threads are described herein.

Direct transfer of information between threads is useful in various scenarios. One example use-case is an aggregator process, in which each thread adds a value to an aggregator value that accumulates the sum of values provided by all threads. In an example implementation, each thread computes a value using some computation, and also receives a value from a preceding thread. The thread sums the received value and its own computed value, and transfers the result to the subsequent thread. Another use-case is matrix multiplication, in which each row element is multiplied several times by different column elements. In case the multiplications of a single row element are distributed across different threads, only a single thread needs to access the memory and load the value of the row element. Using the disclosed techniques, this thread is able to transfer the loaded value to other threads, thereby reducing the total number of memory accesses considerably.

In general, the disclosed technique may also be useful in any scenario in which a data value is used multiple times— When using direct data transfer between threads, the data value can be fetched from the external memory only once, and then transferred between compute nodes within the fabric as needed.

System Description

FIG. 1 is a block diagram that schematically illustrates a Coarse-Grain Reconfigurable Array (CGRA) processor 20, in accordance with an embodiment of the present invention.

Processor 20 is based on a reconfigurable compute fabric 24, which comprises multiple Compute Nodes (CNs) 28 arranged in an array. CNs 28 are also referred to simply as "nodes" for brevity. In an example embodiment, fabric 24 has a total of 256 CNs 28, arranged in a 16-by-16 array, although any other suitable number and arrangement of CNs can be used.

CNs 28 in fabric 24 are connected to one another using interconnects 30, for transferring data and control information (referred to as "tokens") between CNs. In the present embodiment, each CN 28 comprises a switch (not seen in FIG. 1, examples shown in FIGS. 2 and 3 below) that is configurable to connect the CN with one or more selected neighboring CNs. In some embodiments, CNs 28 may send and/or receive additional control information, e.g., configurations and/or exceptions. Such information may be transferred over separate interconnections, e.g., a control network that is separate from interconnects 30. See, for example, the interconnects labeled "TO/FROM CONTROLLER" in FIGS. 2 and 3 below.

Processor 20 further comprises a Level-1 (L1) cache 36 (or, alternatively, a multi-level cache), which is connected to an external memory 40 and to fabric 24. Cache 36 and external memory 40 are referred to collectively as the memory system of the processor. At least some of CNs 28 in fabric 24 are configured to store data in the memory system and to load data from the memory system.

Figure 2:
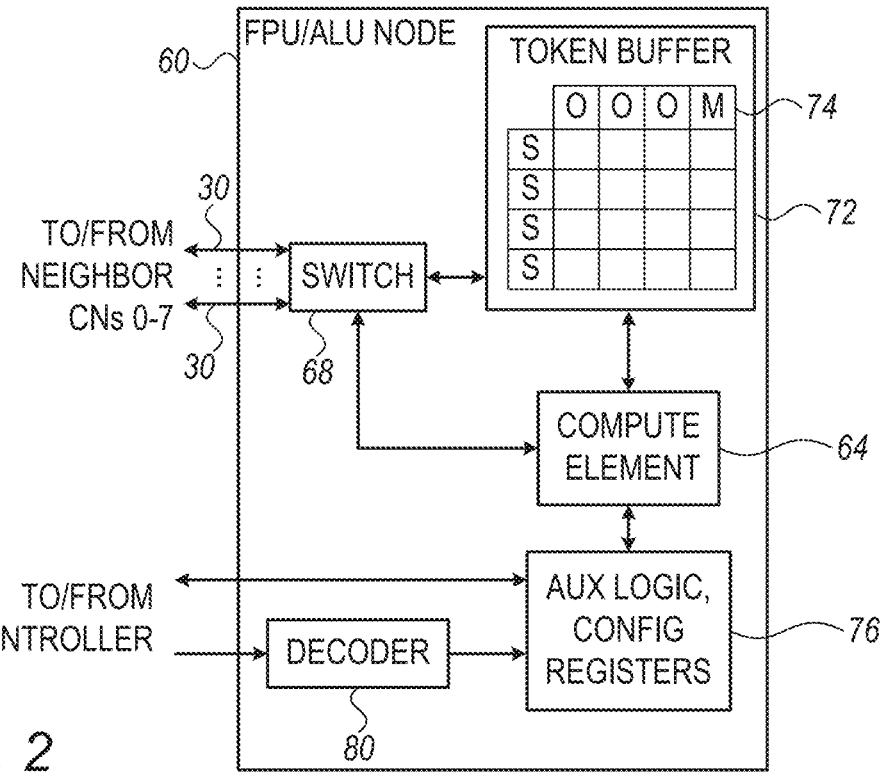
FIG. 2 is a block diagram that schematically illustrates an FPU/ALU node in the CGRA processor of FIG. 1, in accordance with an embodiment of the present invention.
Figure 3:
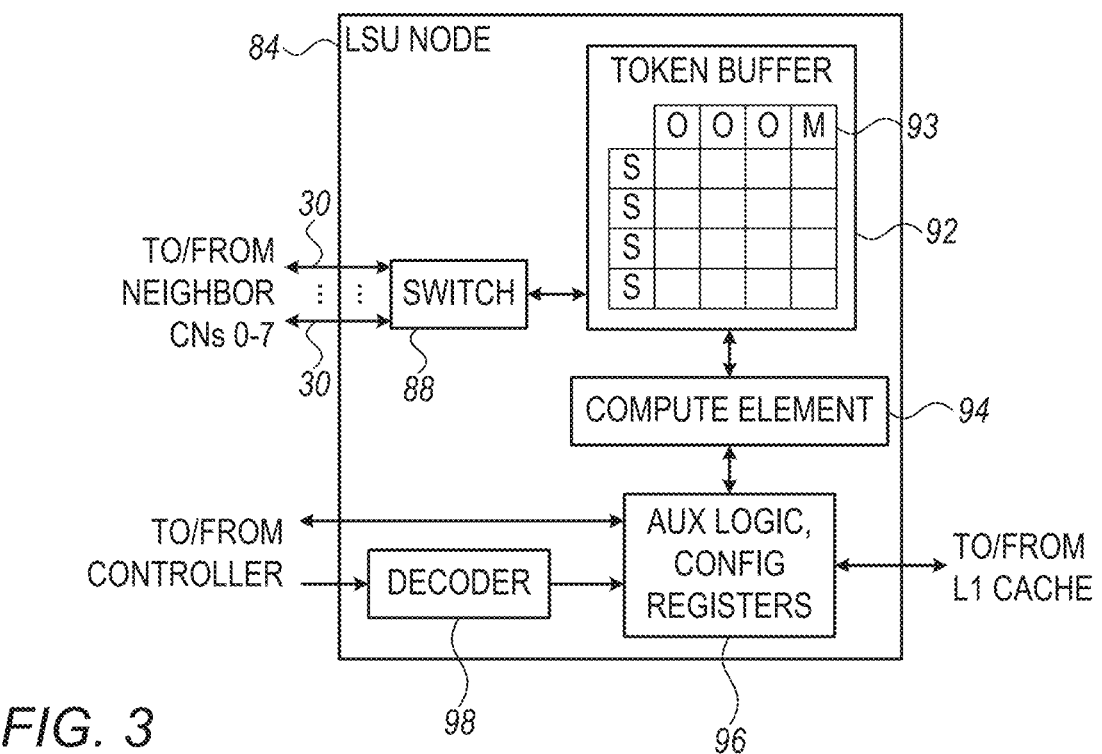
FIG. 3 is a block diagram that schematically illustrates an LSU node in the CGRA processor of FIG. 1, in accordance with an embodiment of the present invention.

In some embodiments, all CNs 28 in fabric 24 are similar in structure. In other embodiments, fabric 24 comprises CNs of two or more different types. FIGS. 2 and 3 below show examples of a Floating Point Unit/Arithmetic Logic Unit (FPU/ALU) CN that is configured to perform mathematical computations, and a Load-Store Unit (LSU) CN that is configured to perform memory load and store operations. In some embodiments, the LSU CNs are located along the perimeter of fabric 24, in order to simplify their interconnection to the memory system. FPU/ALU CNs may be located at any suitable locations in fabric 24. Other types of CNs, not discussed in detail herein, may comprise control CNs, and CNs that perform high-complexity computations such as division or square-root computations.

Processor 20 further comprises a controller 32 that, among other functions, configures fabric 24 to carry out desired computational tasks. Controller 32 typically configures the functionality of each CN, and the interconnection topology between CNs. Controller 32 typically configures fabric 24 by sending control registers to CNs 28 over the control network.

Controller 32 typically receives a compiled version of the software code, produced by a suitable compiler. The compiled code comprises a representation of the software code as a structure 50 of interconnected Data Flow Graphs (DFGs) 54. Each DFG 54 represents a respective section of the code, and has a single entry point and one or more exit points. Each DFG is a directed graph, in which vertices represent code instructions and arcs represent the data flow between instructions. An exit point of a DFG (e.g., a conditional or unconditional branch, a function call or a return from a function, etc.) comprises an instruction that leads to an input of a (different or the same) DFG, or terminates the program.

In order to execute a given DFG, controller 32 configures selected CNs 28, and the interconnections between them, to execute the code instructions and the flow-control specified in the DFG. This operation is also referred to as "mapping the DFG onto the fabric."

A typical DFG begins with readout of initial values (live values) and possibly data from the memory system, then proceeds to perform a sequence of instructions that process the data and possibly store it, and ends with storage of the live values. Generally, however, loading of values from memory (both live values and data) and/or storage of values to memory may be performed at any stage of the DFG, not necessarily at the beginning/end.

In an example implementation, controller 32 configures the fabric to execute such a DFG by assigning one or more LSU CNs to read the initial values, assigning appropriate CNs (e.g., FPU/ALU CNs) to execute the instructions specified in the DFG, and assigning one or more LSU CNs to store the results. Controller 32 also configures the switches of one or more CNs, in order to interconnect the CNs according to the flow specified in the DFG. Examples of such configurations can be found in U.S. Patent Application Publications 2018/0101387 and 2020/0159539, and in U.S. patent application Ser. Nos. 16/860,070 and 16/889,159, cited above.

Once configured with a given DFG, fabric 24 is able to execute multiple threads, each thread performing the instructions of the given DFG on different data, in a pipelined manner. In such a pipelined operation, a given CN executes the same instruction in the DFG (with different arguments), for different threads. As soon as the CN completes execution of the instruction for one thread, it is ready to execute it for the next thread. Typically, different threads process different data since load instructions that load data for the thread specify addresses that depend on the thread ID.

Typically, the size of fabric 24 is not sufficient for executing the entire structure 50, i.e., all DFGs, simultaneously. Thus, in some embodiments, controller 32 comprises a DFG scheduler 44 that schedules execution of the various DFGs 54 in time alternation. Scheduler 44 schedules the DFGs using a data structure referred to as a Next DFG Table (NDT) 48. The operation of scheduler 44, and the various data structures used for scheduling, are described in detail in U.S. patent application Ser. No. 16/860,070, cited above.

FIG. 2 is a block diagram that schematically illustrates an FPU/ALU node 60, in accordance with an embodiment of the present invention. The configuration of node 60 can be used for implementing at least some of CNs 28 in fabric 24 of CGRA processor 20 of FIG. 1.

FPU/ALU node 60 comprises a compute element 64, a switch 68 and a token buffer 72. Switch 68 is configured to connect node 60 to one or more selected neighbor CNs in fabric 24, for receiving input tokens from neighbor CNs and for sending output tokens to neighbor CNs. Input tokens may comprise, for example, data and meta-data (control information) from neighbor CNs to be used as operands in the computation of node 60. Output tokens may comprise, for example, results of the computation of node 60 that are provided to neighbor CNs for subsequent processing. Input and output tokens may also comprise control information.

In the present example, node 60 can be connected to any of eight nearest neighbor CNs 28 in fabric 24, denoted CN0 ... CN7. As such, node 60 has eight interconnects 30 connected to switch 68. Alternatively, any other suitable interconnection topology can be used.

Token buffer 72 is configured to store input tokens that were received from neighbor CNs and are pending for processing. Compute element 64 comprises the circuitry that performs the computations of node 60, e.g., an FPU, an ALU, or any other suitable computation.

Consider a scenario in which controller 32 configures fabric 24 to execute a certain DFG 54. As part of this configuration, FPU/ALU node 60 is assigned to execute a certain code instruction in the DFG. To perform this role, controller 32 configures compute element 64 to perform the computation specified in the instruction, e.g., an addition or multiplication. Controller 32 also configures switch 68 to connect the appropriate interconnects 30 to the CNs that supply inputs to the code instruction and consume the result of the code instruction. This switch may also be configured to transfer values to other CNs without going through compute element 64.

In the present example, node 60 further comprises auxiliary logic 76 and a decoder 80. Auxiliary logic 76 comprises configuration registers that hold the configuration parameters of switch 68 and compute element 64, as configured by controller 32. In addition, auxiliary logic 76 may perform functions such as communication with controller 32, interrupt handling, counters management and the like.

In a typical configuration process, controller 32 sends to FPU/ALU node 60 one or more instructions that configure the configuration registers in auxiliary logic 76. Decoder 80 decodes the instructions received from controller 32, and configures the configuration registers accordingly. In some embodiments node 60 comprises dual configuration registers (also referred to as "shadow registers") for enabling fast switch-over between DFGs.

In the embodiment of FIG. 2, token buffer 72 is divided into slots, with each slot assigned to a respective thread. Each slot is identified by a slot ID that is derived from the corresponding thread ID (tid). Token buffer 72 comprises a table 74 for storing input tokens. Each row in table 74, which represents a respective slot ("S") having a respective slot ID, comprises multiple (e.g., three) "O" columns for storing operands, and an "M" column for storing metadata.

As will be explained in detail below, one possible way for CN 60 (serving as a producer CN) to transfer a value from a producer thread to a consumer thread is for compute element 64 to write the value to the token buffer of the consumer CN (which may be the same CN or a different CN). In an embodiment, compute element 64 associates the value with the identity of the consumer thread by writing the value to the slot ("S") whose slot ID corresponds to the tid of the consumer thread.

In an alternative embodiment, table 74 in token buffer 72 is implemented using multiple First-In First-Out (FIFO) buffers, one FIFO buffer for each operand ("O") column and an additional FIFO buffer for the metadata ("M") column. Since the data arrives in-order, it is sufficient to hold a write pointer and read pointer for each FIFO buffer. In this implementation, the compute element transfers a value to a consumer thread that is K threads later than the producer thread, by writing the value to the FIFO buffer K slots behind the read pointer from which the value was taken and provided to the compute element.

FIG. 3 is a block diagram that schematically illustrates an LSU node 84, in accordance with an embodiment of the present invention. The configuration of node 84 can be used for implementing at some of CNs 28 in fabric 24 of CGRA processor 20 of FIG. 1.

LSU node 84 is configured to execute load and store instructions, i.e., load data from memory 40 via cache 36, and store data to memory 40 via cache 36. As noted above, LSU nodes are typically located along the perimeter of fabric 24, to simplify their interconnection to the memory system.

LSU node 84 comprises a switch 88, a token buffer 92 and a decoder 98, which are similar in structure and functionality to switch 68, buffer 72 and decoder 80 of FPU/ALU node 60, respectively. Node 84 additionally comprises a compute element 94 that is used, for example, for memory address computations. Node 84 further comprises auxiliary logic 96, which performs functions such as communication with controller 32, communication with L1 cache 36, storage of configuration registers, interrupt handling, counters management, NDT update, as well as initiator and terminator functions (to be explained below).

As explained above with respect to FPU/ALU node 60 of FIG. 2, in some embodiments token buffer 92 of LSU node 84, too, is divided into slots, with each slot assigned to a respective thread. Each slot is identified by a slot ID that is derived from the corresponding thread ID (tid). Token buffer 92 comprises a table 93 for storing input tokens. Each row in table 93, which represents a respective slot ("S") having a respective slot ID, comprises multiple (e.g., three) "O" columns for storing operands, and an "M" column for storing metadata.

In some embodiments, compute element 94 of LSU node 84 (serving as a producer CN) transfers a value from a producer thread to a consumer thread by writing the value to the token buffer of the consumer CN (which may be the same CN or a different CN). In an embodiment, compute element 94 associates the value with the identity of the consumer thread by writing the value to the slot ("S") whose slot ID corresponds to the tid of the consumer thread.

In alternative embodiments, table 93 can be implemented using FIFO buffers, as explained above with respect to table 74 of FIG. 2.

In alternative embodiments, initiator and terminator functions may be implemented in separate CNs, not in LSU nodes 84. Thus, in the present context, the terms "initiator" and "terminator" refer to any CN that performs initiator and terminator functions, respectively. Initiator and terminator functions may be implemented in dedicated CNs, or combined with other functions in the same CN, e.g., in an LSU node.

In some embodiments, when mapping a given DFG onto fabric 24, scheduler 44 may deactivate (e.g., power-off) one or more of CNs 28 that do not participate in executing the code instructions specified in the given DFG, in order to reduce power consumption. The scheduler may deactivate only parts of a CN, e.g., only a switch (e.g., switch 68 or 88) or only a compute element (e.g., element 64 or 94).

In some embodiments, when configuring fabric 24 to execute a certain DFG, scheduler 44 configures the fabric with multiple replicas of the DFG that will run concurrently. This feature is useful, for example, for DFGs that are considerably smaller than the fabric. In these embodiments, the DFG replicas execute the same section of the program, but are mapped to different subsets of CNs 28. In particular, each replica of the DFG has its own initiator and terminator nodes.

The configurations of CGRA processor 20, FPU/ALU node 60 and LSU node 84, and their various components, as shown in FIGS. 1-3, are example configurations that are depicted purely for the sake of conceptual clarity. In alternative embodiments, any other suitable configurations can be used. Additional aspects of multi-threaded CGRA processors are addressed in U.S. Patent Application Publication 2018/0101387 and in U.S. patent application Ser. No. 16/860,070, cited above.

In various embodiments, processor 20 and its elements may be implemented using any suitable hardware, such as in an Application-Specific Integrated Circuit (ASIC) or Field-Programmable Gate Array (FPGA). In some embodiments, some of the elements of processor 20, e.g., controller 32, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Initiator and Terminator Operation

In some embodiments, each of the LSU nodes in fabric 24 (e.g., node 84 of FIG. 3) can serve as an initiator or as a terminator. In other embodiments, the initiators and terminators are implemented as dedicated CNs. An initiator is a CN that begins execution of threads in a DFG. A terminator is a CN that completes execution of threads in a DFG.

An initiator typically receives thread batches from scheduler 44 for execution. The initiator then computes the Thread IDs (tid's) for the initiated threads and sends the tid's to its successor CNs 28 in fabric 24 (one after another). Upon receiving a tid, each CN 28 executes its configured computation, and forwards the result to the next CN according to the DFG. Thus, each tid travels through fabric 24 as a data token.

Typically, a thread batch is communicated between scheduler 44 and the initiator as a (Thread_batch_id, Thread_batch_bitmap, Thread_set_ID) tuple. When a thread batch arrives in an initiator, the initiator analyzes the bitmap to identify the Thread IDs it should initiate (e.g., by adding the indices of the set bits in the bitmap to Thread_batch_ID). To avoid stalls, the initiator may use prefetching and double buffering ("shadowing") of thread batches. Whenever a thread batch is received, the initiator immediately requests the next thread batch from scheduler 44.

When an entire thread set completes execution on the present DFG (or when the scheduler decides to end the thread set for some reason, e.g., to perform context switching), i.e., when the scheduler has no remaining thread batches to send, the initiator sends a "final token" down the fabric. This token is not permitted to bypass any other tokens. The final token is sent to all replicas of the DFG, and is used by terminator nodes for verifying that the thread set is completed.

A terminator executes the final branch instruction that exits the present DFG. In the disclosed embodiments, each exit point from a DFG is implemented as a branch instruction, referred to herein as an "exit branch" for brevity. The target address of an exit branch is the start address of the next DFG. An exit branch may be a conditional or unconditional branch instruction. An exit branch may be, for example, a direct branch instruction, an indirect branch instruction, a predicated branch instruction, or a "thread halt" instruction. A DFG may comprise any suitable number of exit points, possibly a single exit point. An exit branch can be located anywhere in the DFG, not necessarily the last instruction.

For exit branches implemented as direct branches, the identities of the successor DFGs are indicated to the terminator node when it is initially configured (as part of configuring the fabric to execute the present DFG). At runtime, the input token (or tokens) to the terminator node, or the terminator node itself, determines the successor DFG according to the branch condition. The successor DFG is determined per thread, depending on the outcome (taken/not taken) of the branch condition for each thread. In an embodiment, the terminator node holds four 64-bit bitmaps. As the threads of the batch complete execution, the terminator node gradually constructs a pair of 64-bit bitmaps, one bitmap for each possible successor DFG (one bit map for each possible outcome of the branch decision).

When all the threads in the batch completed execution, the terminator node holds two bitmaps. In one bitmap, the set bits indicate the threads for which the successor DFG corresponds to the "taken" outcome. In the other bitmap, the set bits indicate the threads for which the successor DFG corresponds to the "not taken" outcome.

When the next batch of thread begins execution, the terminator node uses the other pair of 64-bit bitmaps. This mechanism enables the terminator to return to the first pair of bitmaps in case of out-of-order thread batches. If another batch of threads arrives (i.e., a new address) the terminator updates the least-recently used 64-bit bitmap in the NDT.

For exit branches implemented as indirect branches, the terminator node typically calculates the target addresses of the successor DFGs at runtime using the above-described mechanism. The terminator node computes the address of each successor DFG and updates the relevant 64-bit bitmap. Once a new 64-bit bitmap is needed (e.g., when the present batch of threads is a new batch, or when the successor DFG is different) the terminator node updates the least-recently used 64-bit bitmap in the NDT.

In some embodiments, the terminator node may additionally receive a respective predicate per thread, i.e., a Boolean value that specifies whether the branch is the actual exit point of the DFG or not. The terminator may receive the predicate in an input token. Since a DFG may have several exit points, in the multiple-exit case each exit point will typically be predicated. Per thread, only the actual exit point will receive a true predicate, and the other exit points will receive false predicates.

Upon receiving a final token, the terminator node updates all its active 64-bit bitmaps in the NDT (i.e., updates the NDT with the identities of the successor DFG of each completed thread). Once the NDT update is known to be complete, the terminator node notifies scheduler 44 of the completion by sending a final token. This reporting mechanism enables the scheduler to ensure that all terminators, of all the replicas of the present DFG, have completed executing their respective thread batches.

In an embodiment, instead of using final tokens, scheduler 44 counts the number of thread batches sent to the initiators (e.g., the number of bitmaps sent to the initiators) and compares this number to the number of completed thread batches reported by the terminators (e.g., to the number of bitmaps reported by the terminators). When the number of sent batches (e.g., bitmaps) equals the number of received batches (e.g., bitmaps), the scheduler concludes that execution of the present DFG is completed. At this stage, controller 32 may regard the program state as complete (fully defined), save the state, and switch to a new DFG (of the same program/user or of a different program/user).

Information Transfer Between Threads

In some embodiments of the present invention, processor 20 comprises means for transferring information between different threads running on compute fabric 24. In a typical scenario, a certain CN 28 (referred to in this context as a producer CN) executes a certain code instruction, e.g., a computation, for a certain thread (referred to in this context as a producer thread). The producer CN then transfers the execution result to a same or different CN 28 (referred to in this context as a consumer CN), for use in a different thread (referred to in this context as a consumer thread). The consumer CN uses the transferred result as an operand in executing a code instruction for the consumer thread.

In some disclosed embodiments, the information transfer is performed via the token buffers of CNs 28 (e.g., token buffer 72 of FIG. 2 or token buffer 92 of FIG. 3), not via the memory system (e.g., cache 36 or external memory 40). As such, information transfer between threads is efficient and incurs only small, predictable latency. The configuration of the various CNs to transfer information between threads is typically determined by the compiler. In other words, as part of generating a DFG and mapping it onto CNs 28 of fabric 24, the compiler specifies the various producer CNs, producer threads, consumer CNs and consumer threads and their configurations. This information is thus embodied in the compiled program code provided to controller 32.

Direct transfer of information between threads is useful in various scenarios. One example use-case is an aggregator process, in which each thread adds a value to an aggregator value that accumulates the sum of values provided by all threads. Another use-case is matrix multiplication, in which each row element is multiplied several times by different column elements. In general, the disclosed technique is useful in any scenario in which a data value is used multiple times—When using direct data transfer between threads, the data value can be fetched from the external memory only once, and then transferred between CNs 28 within fabric 24 as needed.

Information transfer between threads is typically carried out by the compute elements of CNs 28 (e.g., compute element 64 of FIG. 2 or compute element 94 of FIG. 3). For clarity, the description that follows will refer by way of example to FPU/ALU CN 60 (FIG. 2) and its components—token buffer 72 and switch 68. Generally, however, this technique can be implemented in any other suitable CN, e.g., in LSU CN 84 (FIG. 3). In some embodiments, fabric 24 comprises compute nodes that are dedicated to the task of transferring information between threads. Example configurations of this sort are described in U.S. Provisional Patent Application 62/904,706, cited above.

In an embodiment, compute element 64 of FPU/ALU CN 60 executes a code instruction for a thread denoted thread1. In the present example, the execution result is to be used as an operand by the same compute element, in executing the code instruction for a different thread denoted thread2. In this embodiment, compute element 64 saves the result to token buffer 72. When CN 60 later executes the code instruction for thread2, compute element 64 reads the result from token buffer 64 and uses it as an operand in the calculation performed for thread2.

In various embodiments, compute element 64 may use various techniques for indicating that the result saved in token buffer 72 is destined to thread2. In one example embodiment (as demonstrated by table 74 in FIG. 2), token buffer 72 is divided into slots, with each slot assigned to a respective thread (e.g., to a respective thread ID—tid). Compute element 64 may address the result to thread2 by saving the result to a slot assigned to the tid of thread2 (even though the thread being currently served by the compute element is thread1).

In an alternative embodiment of transferring a result from thread1 to thread2, compute element 64 may transfer the result to a different CN 28, for use as an operand in a different code instruction. For example, compute element 64 may control switch 68 to connect to the other CN, and then save the result to the token buffer of the other CN. In this case, compute element 64 may transfer, along with the result, metadata that determines the slot ID to which the token is to be written to. Typically, this metadata is specified by the compiler as part of the DFG.

In yet other embodiments, the compute element may transfer the same result to multiple destinations, in the same CN and/or in one or more other CNs, for use as operands in one or more other threads.

Typically, when executing threads according to a certain DFG, the threads have a certain predefined order of execution. Generally, information can be passed from a thread to a thread that occurs later in the execution order, or to a thread that occurs earlier in the execution order. Transferring information from a producer thread to an earlier consumer thread typically means that the consumer CN has to wait with execution of the computation for the consumer thread, until the producer thread has produced and transferred the information.

Moreover, information transfer is not limited to threads that are adjacent to one another in the execution order. In some embodiments (purely for convenience and without loss of generality) the threads are assigned successive tid's in accordance with the predefined order of execution. When using this convention, the distance between thread1 and thread2 in the execution order is given by $\Delta=\text{tid}(\text{thread2})-\text{tid}(\text{thread1})$. The disclosed information transfer techniques are applicable to any value of $\Delta$, positive or negative.

Consider a scenario in which each thread is required to pass information to a thread that is later by a specified $\Delta$ in the order of execution. In such a scenario, the last $\Delta$ threads in the set have no thread to pass the information to, and the first $\Delta$ threads in the set have no thread to receive the information from. By the same token, consider a scenario in which each thread is required to pass information to a thread that is earlier by a specified $\Delta$ in the order of execution. In such a scenario, the first $\Delta$ threads in the set have no thread to pass the information to, and the last $\Delta$ threads in the set have no thread to receive the information from.

In some embodiments, CNs 28 are configured to handle this sort of "edge effect" internally and autonomously. In an embodiment, the compute element of the producer CN is configured to check whether the consumer thread is outside the set of threads (e.g., whether the tid of the consumer thread is outside the valid range of tid's of the set of threads). If so, the compute element refrains from passing the information. The compute element of the consumer CN is configured to check whether the producer thread is outside the set of threads (e.g., whether the tid of the producer thread is outside the valid range of tid's of the set of threads). If so, the compute element obtains the information (e.g., operand) from an alternative source. The alternative source may be, for example, a predefined constant or a memory location.

Figure 4:
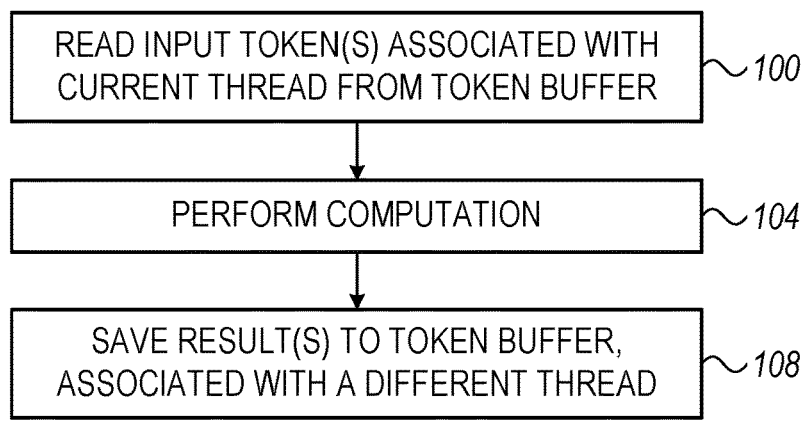
FIG. 4 is a flow chart that schematically illustrates a method for transferring information between threads in the CGRA processor of FIG. 1, in accordance with an embodiment of the present invention.

FIG. 4 is a flow chart that schematically illustrates a method for transferring information from a producer thread thread1 to a consumer thread thread2 in CGRA processor 20, in accordance with an embodiment of the present invention. The method begins with a compute element of a producer CN reading one or more input tokens from its token buffer, for use as operands in a code instruction for thread1, at a readout step 100. At an execution step 104, the compute element of the producer CN executes the code instruction for thread1, e.g., performs a certain computation. At a transferal step 108, the compute element of the producer CN saves the result (or results) of the code instruction to the token buffer of a consumer CN (which may be the same CN or a different CN), as one or more tokens. The compute element of the producer CN saves the result in a slot of the token buffer that is assigned to thread2. Subsequently, the consumer CN will read the result from its token buffer and use it as an operand in a code instruction for thread2.

Transferring Information Between Distant Threads

In some embodiments, each token buffer has a total number of slots that can serve only a certain number of threads (a certain range of tid's) at any given time. In the examples described above, an underlying assumption was that the token buffer used for saving the transferred information is large enough to serve both the producer thread and the consumer thread at the same time. In other words, the number of slots in the token buffer was assumed to be larger than $|\Delta|$. In some practical scenarios, however, it is desirable to transfer information between distant threads, beyond the size of the token buffer. Processor 20 may use various techniques to meet this requirement.

In some embodiments, when generating a DFG, the compiler identifies situations in which the inter-thread distance $\Delta$=tid(thread2)−tid(thread1) is larger in absolute value than the number of slots in the token buffer. In such a case, the compiler uses the token buffers of multiple (two or more) CNs 28 for transferring the information from thread1 to thread2. The compiler substantially cascades the token buffers of multiple CNs, so that the total size of the cascaded token buffers is larger than 01.

In some embodiments, the multiple CNs function similarly to a single CN having a large token buffer. For example, the slots of the multiple token buffers are treated as a single large pool of token buffers and are thus assigned to a large number of threads. The compute element of one of the CNs may write and read tokens to and from the slots of any of the multiple token buffers.

In an alternative embodiment, seen in FIG. 5 below, multiple token buffers are not simply cascaded, but also enclosed in a feedback loop with multiplexers. This configuration allows a data value to be fetched only once from memory, and then be used multiple times by multiple threads using direct transfer within and between token buffers. (Note that the advantage of fetching a data value only once from memory is not limited to scenarios of large inter-thread distance.)

Figure 5:
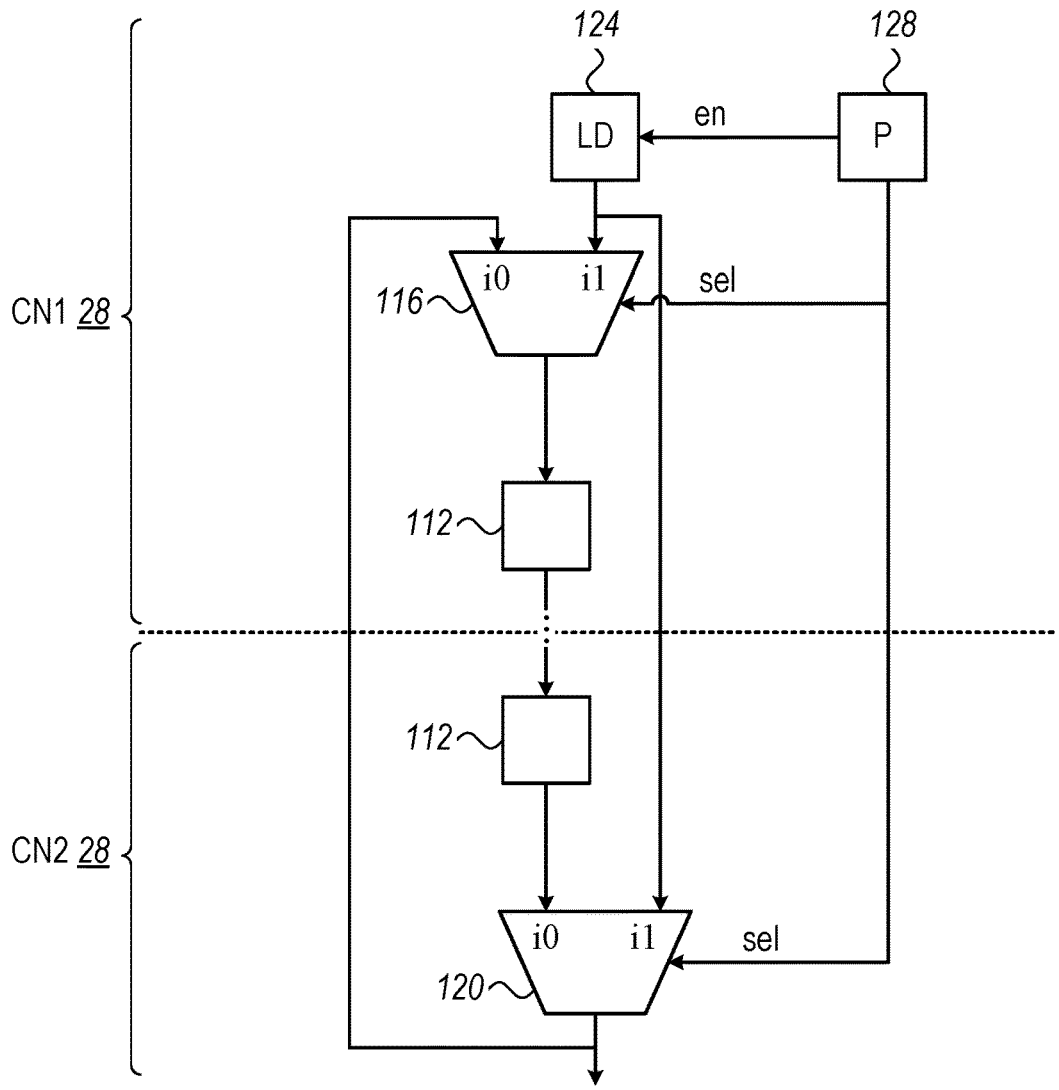
FIG. 5 is a block diagram that schematically illustrates information transfer between threads using token buffers of two compute nodes, in accordance with an embodiment of the present invention.

FIG. 5 is a block diagram that schematically illustrates information transfer between threads using token buffers of two CNs 28, in accordance with an embodiment of the present invention. The example of FIG. 5 refers to two CNs, but the disclosed technique can be used with any suitable number of CNs, to implement an effective token buffer having any desired number of slots.

FIG. 5 shows two CNs 28, denoted CN1 and CN2. CN1 comprises a Load (LD) unit 124 that loads a data value from the memory system, a predicate unit 128 (denoted P), a multiplexer (MUX) 116, and an inter-thread transfer unit 112. Predicate unit 128 calculates the predicate, e.g., by comparing the tid, modulo some predefined number, to zero. Inter-thread transfer unit 112 transfers tokens between threads, using the token buffers of the two CNs. CN2 comprises another unit 112, and a MUX 120. The sum of the delays added by both cascaded units 112 can be configured to any value between zero and twice the token buffer size, and is denoted $|\Delta|$.

The output of LD unit 124 is provided to one input (i1) of MUX 116 and to one input (i1) of MUX 120. Units 112 are cascaded between the output of MUX 116 and the second input (i0) of MUX 120. The output of MUX 120 is fed back to the second input (i0) of MUX 116. The output of predicate unit 128 is used as a selection signal in both MUXs, and as an "enable" signal for LD unit 124.

Predicate unit 128 outputs "1" for the first $|\Delta|$ code instructions that use the data values in question, and "0" for $N*|\Delta|$ subsequent code instructions, where N can be any integer number. Therefore, on the first $|\Delta|$ code instruction that use the data values, LD unit 124 loads the data values from memory. At this stage, the "1" output of unit 128 controls both MUXs to select the i1 input. As a result, the data value is provided to the input of the cascaded token buffers 112, and also to the output of CN2.

On subsequent $N*|\Delta|$ code instructions, predicate unit 128 outputs "0". In response, LD unit 124 is inhibited and does not load the data values again. In addition, the "0" output of unit 128 controls both MUXs to select the i0 input. As a result, the output of CN2 is taken from the end of the cascaded units 112, and this output is also fed back to the beginning of the cascade.

After executing each code instruction, units 112 transfer the tokens from one slot to the next in the token buffers of CN1 and CN2. Specifically, the token in the last slot of the token buffer of CN1 is transferred to the first slot of the token buffer of CN2. As a result, subsequent threads are able to use the same data value by reading it from MUX 116, without having to read the value repeatedly from memory.

The scheme of FIG. 5 can be used, for example, in matrix multiplication (e.g., for reading a column). Alternatively, the methods and systems described herein can also be used in other applications, such as in databases, for example for cross joining two tables.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:
1. A processor, comprising:
a compute fabric, which is configured to execute specified code instructions in parallel on different data using multiple threads, the compute fabric comprising an array of compute nodes and interconnects that configurably connect the compute nodes, the compute fabric further configured to access a memory system of the processor; and
a controller, arranged to (i) configure at least a group of the compute nodes in the array and at least some of the interconnects in the compute fabric to execute the specified code instructions, including assigning each compute node in the group to execute a respective same code instruction for the multiple threads, and (ii) instruct the compute fabric to execute the multiple threads,
wherein a compute node in the group referred to as a producer compute node, is configured to transfer an execution result from a first thread to a second thread, different from the first thread, by sending within the compute fabric, without accessing the memory system of the processor, to another compute node in the group referred to as a consumer compute node:
  (i) the execution result, for use as an operand on which the consumer compute node is to execute a given code instruction, and
  (ii) an identity of the second thread that is to use the operand in the consumer compute node; and
wherein the consumer compute node is configured to receive the execution result and the identity of the second thread, and to execute the given code instruction on the operand for the second thread, and
wherein the producer compute node is configured to transfer the execution result by saving the execution result to a token buffer that comprises multiple slots, each slot assigned to a respective thread, and to associate the execution result with the second thread by saving the result to a slot assigned to the second thread.

2. The processor according to claim 1, wherein the token buffer is a combined token buffer comprising a cascade of two or more token buffers of two or more of the compute nodes.

3. The processor according to claim 1, wherein the multiple threads have a predefined order of execution, and wherein the first thread is earlier than the second thread in the order of execution.

4. The processor according to claim 1, wherein the multiple threads have a predefined order of execution, and wherein the first thread is later than the second thread in the order of execution.

5. The processor according to claim 1, wherein, in instructing the compute fabric to execute the multiple threads, the controller is configured to provide to the compute fabric a range of identifiers of the threads to be executed, and wherein the producer compute node is configured to transfer the execution result only when an identifier of the second thread is within the range.

6. The processor according to claim 1, wherein, in instructing the compute fabric to execute the multiple threads, the controller is configured to provide to the compute fabric a range of identifiers of the threads to be executed, and wherein the consumer compute node, which is assigned to use the execution result as an operand, is configured to use the transferred execution result only when an identifier of the second thread is within the range.

7. The processor according to claim 6, wherein, when the identifier of the second thread is outside the range, the consumer compute node, which is assigned to use the execution result as an operand, is configured to obtain the operand for execution of the second thread from an alternative source comprising a predefined constant or a memory location.

8. A method, comprising:
in a processor that includes a compute fabric comprising an array of compute nodes and interconnects that configurably connect the compute nodes, the compute fabric being configurable to execute specified code instructions on different data in parallel using multiple threads, the compute fabric being further configured to access a memory system of the processor, configuring at least a group of the compute nodes in the array and at least some of the interconnects in the compute fabric to execute the specified code instructions, including assigning each compute node in the group to execute a respective same code instruction for the multiple threads;
instructing the compute fabric to execute the multiple threads;
in a compute node in the group referred to as a producer compute node, transferring an execution result from a first thread to a second thread, different from the first thread, by sending within the compute fabric, without accessing the memory system of the processor, to another compute node in the group referred to as a consumer compute node:
  (i) the execution result, for use as an operand on which the consumer compute node is to execute a given code instruction, and
  (ii) an identity of the second thread that is to use the operand in the consumer compute node; and
in the consumer compute node, receiving the execution result and the identity of the second thread, and executing the given code instruction on the operand for the second thread,
wherein transferring the execution result comprises saving the result to a token buffer that comprises multiple slots, each slot assigned to a respective thread, and associating the execution result with the second thread by saving the execution result to a slot assigned to the second thread.

9. The method according to claim 8, wherein the token buffer is a combined token buffer comprising a cascade of two or more token buffers of two or more of the compute nodes.

10. The method according to claim 8, wherein the multiple threads have a predefined order of execution, and wherein the first thread is earlier than the second thread in the order of execution.

11. The method according to claim 8, wherein the multiple threads have a predefined order of execution, and wherein the first thread is later than the second thread in the order of execution.

12. The method according to claim 8, wherein instructing the compute fabric to execute the multiple threads comprises providing to the compute fabric a range of identifiers of the threads to be executed, and wherein transferring the execution result is performed only when an identifier of the second thread is within the range.

13. The method according to claim 8, wherein instructing the compute fabric to execute the multiple threads comprises providing to the compute fabric a range of identifiers of the threads to be executed, and comprising, in the consumer compute node, which is assigned to use the execution result as an operand, using the transferred execution result only when an identifier of the second thread is within the range.

14. The method according to claim 13, and comprising, when the identifier of the second thread is outside the range, obtaining the operand for execution of the second thread from an alternative source comprising a predefined constant or a memory location.

* * * * *